(12) United States Patent
Senthil

(10) Patent No.: US 11,475,506 B2
(45) Date of Patent: Oct. 18, 2022

(54) SYSTEM AND METHOD TO MANAGE BI-DIRECTIONAL ELECTRONIC COMMERCE ORDER FULFILLMENT PROCESS

(71) Applicant: 1ClickPay Inc, Sammamish, WA (US)

(72) Inventor: Kumar N Senthil, Sammamish, WA (US)

(73) Assignee: 1ClickPay Inc, Sammamish, WA (US)

( * ) Notice: Subject to any disclaimer, the term of this patent is extended or adjusted under 35 U.S.C. 154(b) by 0 days.

(21) Appl. No.: 17/203,888

(22) Filed: Mar. 17, 2021

(65) Prior Publication Data

US 2022/0301040 A1      Sep. 22, 2022

(51) Int. Cl.
| | | |
|---|---|---|
| *G06Q 30/00* | (2012.01) | |
| *G06Q 30/06* | (2012.01) | |
| *G06F 9/54* | (2006.01) | |
| *G06Q 20/24* | (2012.01) | |
| *G06Q 20/10* | (2012.01) | |

(52) U.S. Cl.
CPC ......... *G06Q 30/0635* (2013.01); *G06F 9/547* (2013.01); *G06Q 20/102* (2013.01); *G06Q 20/24* (2013.01)

(58) Field of Classification Search
None
See application file for complete search history.

(56) References Cited

U.S. PATENT DOCUMENTS

| | | |
|---|---|---|
| 8,473,316 B1 | 6/2013 | Panzitta et al. |
| 10,134,078 B2 * | 11/2018 | Bentrup ................. G06Q 50/01 |
| 2007/0038524 A1 | 2/2007 | Fiechter et al. |
| 2009/0089113 A1 * | 4/2009 | Rousso .............. G06Q 30/0601 |
| | | 705/26.1 |
| 2019/0057349 A1 | 2/2019 | Pan |
| 2019/0347606 A1 * | 11/2019 | Malecha ............ G06Q 30/0201 |

\* cited by examiner

*Primary Examiner* — Mila Airapetian
(74) *Attorney, Agent, or Firm* — Jason C. Cameron

(57) ABSTRACT

A system to manage bi-directional electronic commerce order fulfillment process is disclosed. A processing subsystem including an order receiving module to receive one or more purchase orders corresponding to one or more products from a buyer at a first platform. An order handling module determines product state information associated with the first platform, identifies a requirement of transferring the one or more purchase orders corresponding to the one or more products to a second platform, transfers the one or more purchase orders from the first platform to the second platform via one or more order transferring processes. An order fulfilment module conveys buyer information associated with purchasing of the one or more products to the second platform, manages one or more payment options for financing the one or more products, receives delivery initiation information of the one or more products to the buyer, obtains an order fulfillment confirmation.

18 Claims, 6 Drawing Sheets

SYSTEM AND METHOD TO MANAGE BI-DIRECTIONAL ELECTRONIC COMMERCE ORDER FULFILLMENT PROCESS

BACKGROUND

Embodiments of the present disclosure relate to an order processing system in electronic commerce platform and more particularly to a system and a method to manage bi-directional electronic commerce order fulfillment process.

Order fulfilment is defined as one or more steps involved in receiving, processing and delivering orders to end customers. The order fulfilment process starts with an end customer placing an order and ends once they receive the order successfully. Generally, the order fulfilment process is an expensive and a complex process. Some companies handle the order fulfilment in-house, while others outsource the process to a third-party logistics company or a supplier to complete the process. In the in-house order fulfilment model, a business uses its own employees to manage the order fulfilment process. Employees handle all steps of the fulfilment process, including storing and shipping one or more products on-site at a company-controlled location. Similarly, in case of outsourced order fulfilment process, the third-party logistics employees handle the entire fulfilment process from end-to-end, from receiving inventory from manufacturers to delivering orders to the end customer. Also, inventory is stored in a warehouse controlled by the third-party logistics. Various other types of order fulfilment processes similar to outsourcing concept are available which are utilized by several electronic commerce (e-commerce) platforms to handle the orders.

Conventionally, the system available for handling the order fulfilment in the e-commerce platforms include utilization of drop shipping approaches thereby outsourcing the third-party logistics companies to ensure delivery of the orders from retailers to the end customer within a desired time period without requirement of maintaining an inventory by the third-party logistics. However, such a conventional order fulfilment system requires manual intervention to manage several entities involved in the order fulfilment process starting from the retailers to the suppliers. Also gathering one or more product associated details from the retailers to ensure correct supply of the orders to respective customers requires manual intervention, which is time consuming, error prone and also makes the overall process slow.

Hence, there is a need for an improved system and a method to manage bi-directional electronic commerce order fulfillment process in order to address the aforementioned issues.

BRIEF DESCRIPTION

In accordance with an embodiment of a present disclosure, a system to manage bi-directional electronic commerce order fulfillment process is disclosed. The system includes a processing subsystem hosted on a server. The processing subsystem is configured to execute on a network to control bidirectional communications among a plurality of modules. The processing subsystem also includes an order receiving module configured to receive one or more purchase orders corresponding to one or more products from a buyer at a first platform. The processing subsystem also includes an order handling module operatively coupled to the order receiving module. The order handling module is configured to determine product state information associated with the first platform based on the one or more purchase orders received corresponding to the one or more products. The order handling module is also configured to identify a requirement of transferring the one or more purchase orders corresponding to the one or more products to a second platform based on the product state information determined. The order handling module is also configured to transfer the one or more purchase orders from the first platform to the second platform via one or more order transferring processes based on a transferring requirement identified. The processing subsystem also includes an order fulfilment module operatively coupled to the order handling module. The order fulfilment module is configured to convey buyer information associated with purchasing of the one or more products to the second platform seamlessly upon transferring of the one or more purchase orders. The order fulfilment module is also configured to manage one or more payment options provided by the second platform for financing the one or more products to the buyer based on the buyer information conveyed. The order fulfilment module is also configured to receive delivery initiation information of the one or more products to the buyer from the second platform, wherein the delivery initiation information is received upon completion of payment of the one or more products through the one or more payment options. The order fulfilment module is also configured to obtain an order fulfillment confirmation from the second platform upon successful delivery of the one or more products to the buyer.

In accordance with another embodiment of the present disclosure, a method to manage bi-directional electronic commerce order fulfillment process is disclosed. The method includes receiving, by an order receiving module of a processing subsystem, one or more purchase orders corresponding to one or more products from a buyer at a first platform. The method also includes determining, by an ordering handling module of the processing subsystem, product state information associated with the first platform based on the one or more purchase orders received corresponding to the one or more products. The method also includes identifying, by the order handling module, a requirement of transferring the one or more purchase orders corresponding to the one or more products to a second platform based on the product state information determined. The method also includes transferring, by the order handling module, one or more purchase orders from the first platform to the second platform via one or more order transferring processes based on a transferring requirement identified. The method also includes conveying, by an order fulfillment module, buyer information associated with purchasing of the one or more products to the second platform seamlessly upon transferring of the one or more purchase orders. The method also includes managing, by the order fulfillment module, one or more payment options provided by the second platform for financing the one or more products to the buyer based on the buyer information conveyed. The method also includes receiving, by the order fulfillment module, delivery initiation information of the one or more products to the buyer from the second platform, wherein the delivery initiation information is received upon completion of payment of the one or more products through the one or more payment options. The method also includes obtaining, by the order fulfillment module, an order fulfillment confirmation from the second platform upon successful delivery of the one or more products to the buyer.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 5 (b) illustrates continued steps of the method of FIG. 5 (a) in accordance with an embodiment of the present disclosure.

Figure 1:
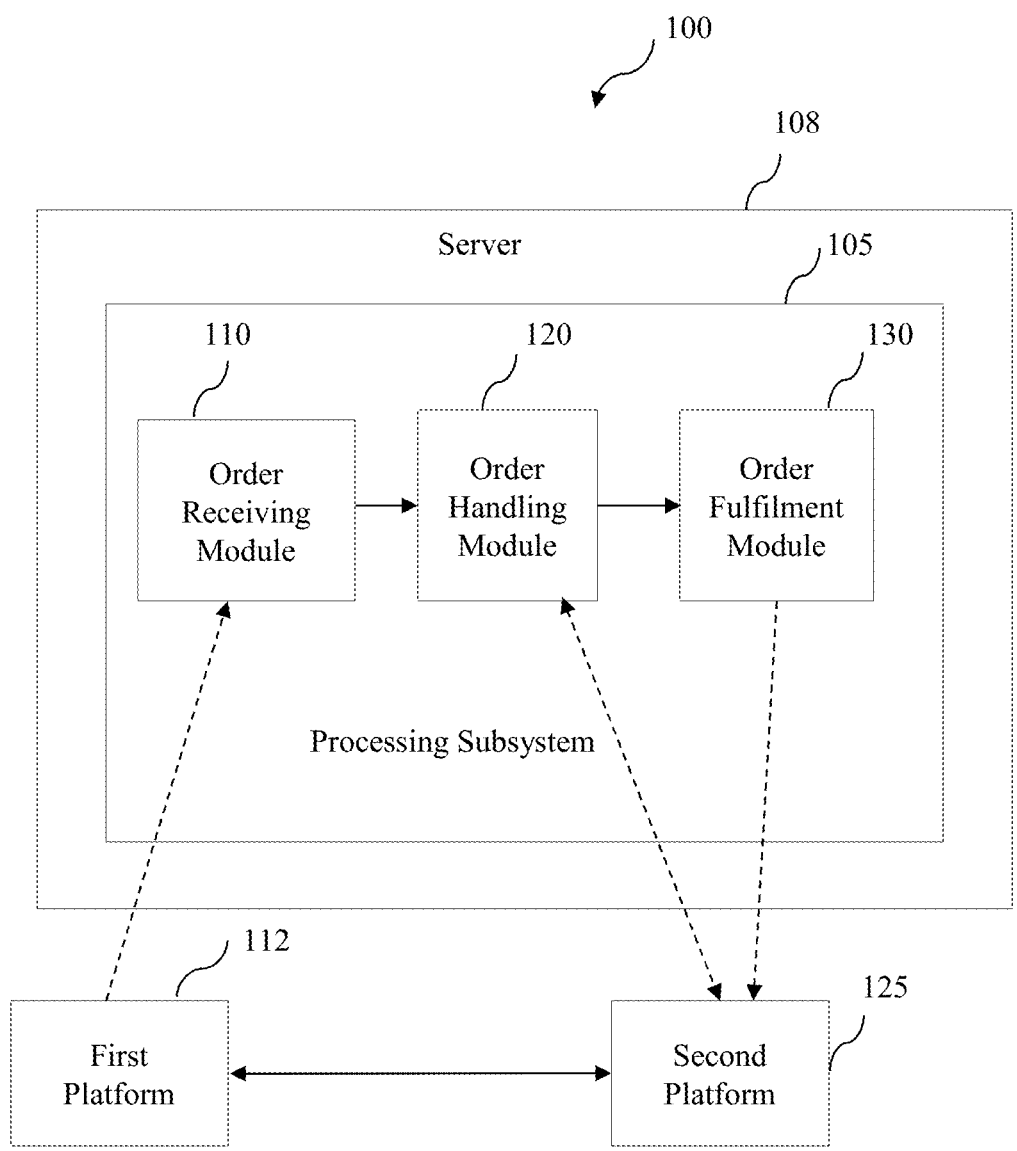
FIG. 1 is a block diagram of a system to manage bi-directional electronic commerce order fulfillment process in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to manage bi-directional electronic commerce order fulfillment process. The system includes a processing subsystem hosted on a server. The processing subsystem is configured to execute on a network to control bidirectional communications among a plurality of modules. The processing subsystem also includes an order receiving module configured to receive one or more purchase orders corresponding to one or more products from a buyer at a first platform. The processing subsystem also includes an order handling module operatively coupled to the order receiving module. The order handling module is configured to determine product state information associated with the first platform based on the one or more purchase orders received corresponding to the one or more products. The order handling module is also configured to identify a requirement of transferring the one or more purchase orders corresponding to the one or more products to a second platform based on the product state information determined. The order handling module is also configured to transfer the one or more purchase orders from the first platform to the second platform via one or more order transferring processes based on a transferring requirement identified. The processing subsystem also includes an order fulfilment module operatively coupled to the order handling module. The order fulfilment module is configured to convey buyer information associated with purchasing of the one or more products to the second platform seamlessly upon transferring of the one or more purchase orders. The order fulfilment module is also configured to manage one or more payment options provided by the second platform for financing the one or more products to the buyer based on the buyer information conveyed. The order fulfilment module is also configured to receive delivery initiation information of the one or more products to the buyer from the second platform, wherein the delivery initiation information is received upon completion of payment of the one or more products through the one or more payment options. The order fulfilment module is also configured to obtain an order fulfillment confirmation from the second platform upon successful delivery of the one or more products to the buyer.

FIG. 1 is a block diagram of a system 100 to manage bi-directional electronic commerce order fulfillment process in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to execute on a network (not shown in FIG. 1) to control bidirectional communications among a plurality of modules. In one embodiment, the network may include a wired network such as local area network (LAN). In another embodiment, the network may include a wireless network such as Wi-Fi, Bluetooth, Zigbee, near field communication (NFC), infra-red communication (RFID) or the like.

The processing subsystem 105 also includes an order receiving module 110 configured to receive one or more purchase orders corresponding to one or more products from a buyer at a first platform 112. As used herein, the term 'purchase order' is defined as a commercial document which is sent from a buyer to a supplier with a request for products or services as an order. In one embodiment, the one or more purchase orders may have information of at least one of a type of one or more products, a quantity of one or more products, agreed price for one or more products from a supplier or a combination thereof. In some embodiment, the one or more purchase orders corresponding to each of the one or more products are received from the buyer at a website associated with a primary merchant. As used herein, the term 'primary merchant' is defined as a retailer engaged in retail trade for selling the one or more products.

The processing subsystem 105 also includes an order handling module 120 operatively coupled to the order receiving module 110. The order handling module 120 is configured to determine product state information associated with the first platform based on the one or more purchase orders received corresponding to the one or more products. In one embodiment, the product state information may include at least one of stock availability with a primary merchant, urgency of delivery requirement of the buyer, distance between a primary merchant and the buyer or a combination thereof. In such embodiment, the one or more products may include, but not limited to, an electronics product, a fashion accessory, an apparel, a stationary product, an edible product, a home decor product, a home appliance and the like.

The order handling module 120 is also configured to identify a requirement of transferring the one or more purchase orders corresponding to the one or more products to a second platform 125 based on the product state information determined. In one embodiment, the second platform may include a website associated with an original equipment manufacturer (OEM). In another embodiment, the second platform may also include a website associated with a secondary merchant. In such embodiment, the secondary merchant may include a supplier or an external service provider for supplying the order of the one or more products to one or more customers.

The order handling module 120 is also configured to transfer the one or more purchase orders from the first platform to the second platform via one or more order transferring processes based on a transferring requirement identified. In one embodiment, the one or more order transferring processes may include at least one of an electronic data interchange (EDI) process, a secure file transfer protocol (SFTP), an application programming interface (API) or a combination thereof. The EDI process helps in exchanging of the one or more purchase orders as well as one or more commercial documents in a standard electronic format between several platforms. Similarly, the SFTP protocol provides file access, file transfer, and file management over any reliable data stream across the several platforms. Again, the API enables several platforms to communicate with each other in order to pump information from one platform to another automatically.

The processing subsystem 105 also includes an order fulfilment module 130 operatively coupled to the order handling module 120. The order fulfilment module 130 is configured to convey buyer information associated with purchasing of the one or more products to the second platform seamlessly upon transferring of the one or more purchase orders. In one embodiment, the buyer information includes at least one of a credit card information of the buyer, a billing address of the buyer, a shipping address of the buyer, a mode of payment selected by the buyer or a combination thereof. The order fulfilment module 130 is also configured to manage one or more payment options provided by the second platform for financing the one or more products to the buyer based on the buyer information conveyed. In a specific embodiment, the one or more payment options includes at least one of a pay on delivery option, an internet banking payment option, a loan option, a debit card payment option, a credit card payment option, or an equated monthly installment option.

The order fulfilment module 130 is also configured to receive delivery initiation information of the one or more products to the buyer from the second platform, wherein the delivery initiation information is received upon completion of payment of the one or more products through the one or more payment options. The order fulfilment module 130 is also configured to obtain an order fulfillment confirmation from the second platform upon successful delivery of the one or more products to the buyer.

Figure 2:
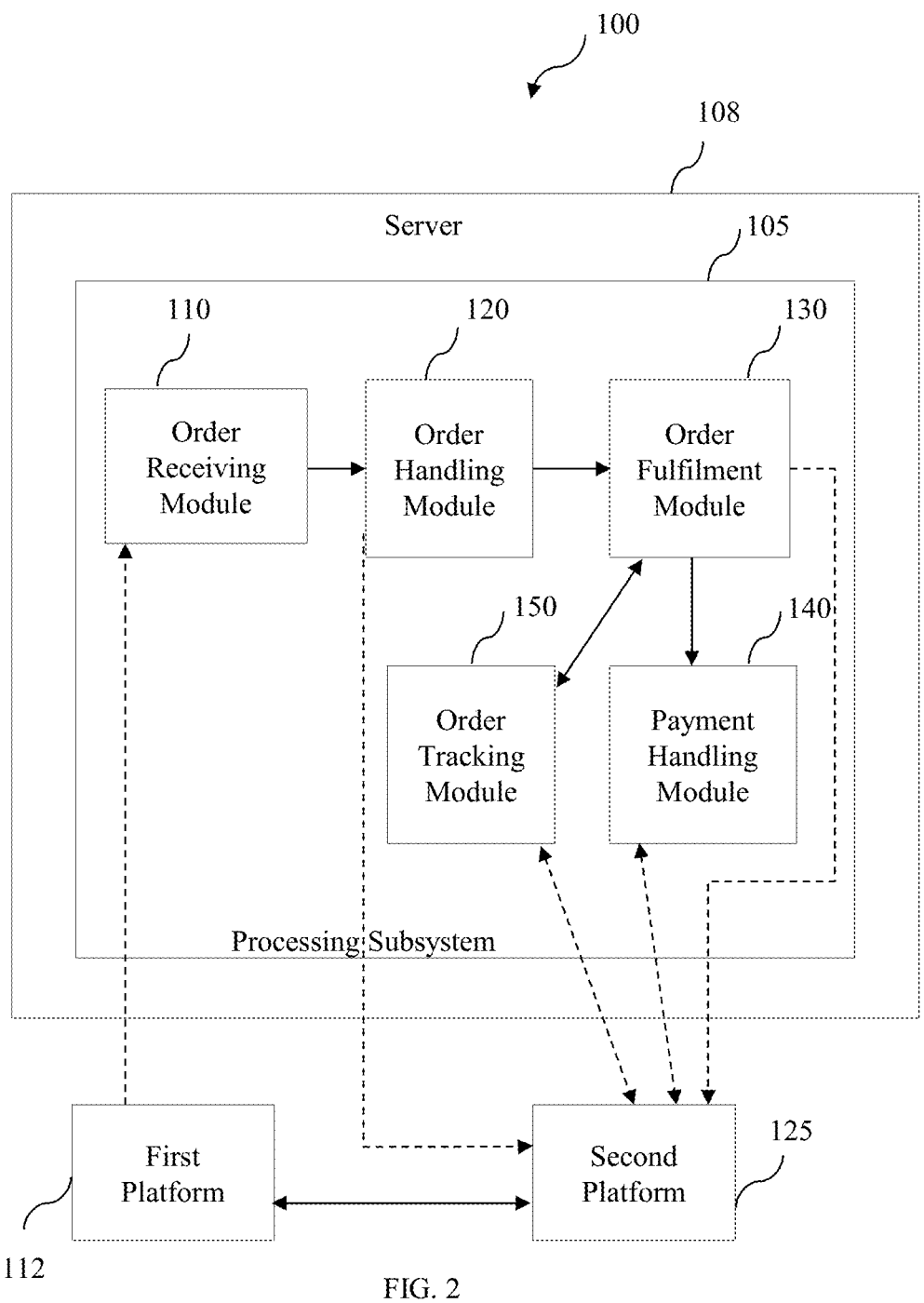
FIG. 2 is a block diagram representation of an embodiment of a system to manage bi-directional electronic commerce order fulfillment process of FIG. 1 in accordance with an embodiment of the present disclosure.

FIG. 2 is a block diagram representation of an embodiment of a system 100 to manage bi-directional electronic commerce order fulfillment process of FIG. 1 in accordance with an embodiment of the present disclosure. As described in aforementioned FIG. 1, the system includes a processing subsystem 105 which includes an order receiving module 110, an order handling module 120 and an order fulfilment module 130. In addition, the processing subsystem 105 also includes a payment handling module 140 operatively coupled to the order fulfillment module 130. The payment handling module 140 is configured to notify one or more external finance providers integrated with the system to sanction a predefined loan amount for financing the one or more products to the buyer when the one or more payment options comprises a loan option. In a specific embodiment, the predefined loan amount is sanctioned by the one or more finance providers based on evaluation of credit information of the buyer. In such embodiment, the credit information is evaluated based on a credit score associated with the purchaser. In such embodiment, the credit score is fetched from an external interface. Once, the credit history is evaluated, the payment handling module 140 sanctions the predefined loan amount to the buyer, wherein the predefined loan amount includes a virtual credit amount for utilization purchasing of the one or more products.

Also, the processing subsystem 105 includes an order tracking module 150 operatively coupled to the order fulfillment module 130, wherein the order tracking module 150 is configured to receive a tracking identity number associated with delivery of the one or more products from the second platform. In one embodiment, the tracking identity number includes a unique number of a predetermined format. The order tracking module 150 is also configured to provide the tracking identity number corresponding to each of the one or more products to the buyer for real-time tracking of order fulfillment process.

Figure 3:
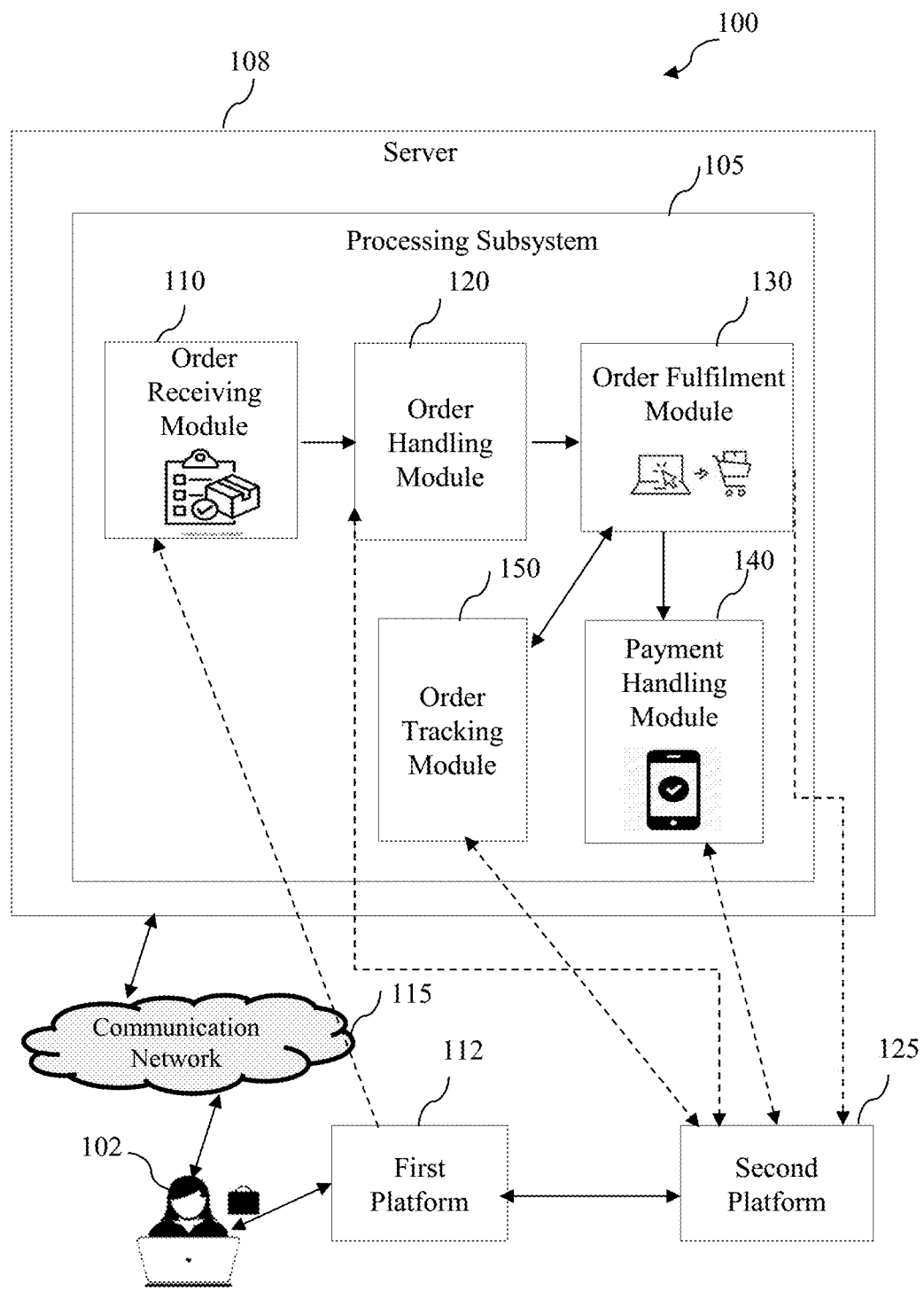
FIG. 3 illustrates a schematic representation of an exemplary embodiment of a system to manage bi-directional electronic commerce order fulfillment process of FIG. 1 in accordance with an embodiment of the present disclosure.

FIG. 3 illustrates a schematic representation of an exemplary embodiment of a system 100 to manage bi-directional electronic commerce order fulfillment process of FIG. 1 in accordance with an embodiment of the present disclosure. Considering an example, where the system 100 is utilized by an electronic commerce (e-commerce) platform 'X' for handling order fulfilment of one or more products. In the example used herein, the e-commerce platform 'X' sells various categories of products such as consumer electronic product, home appliances, fashion accessories as well as apparels. The system 100 utilized by the e-commerce platform enables supply of the one or more products sold by the e-commerce platform to each corresponding buyers respectively. For order fulfilment of the one or more products to each of the corresponding one or more buyers the system 100 first needs to gather order information related to each of the one or more products. Here, the order information is gathered from an order receiving module 110 of a processing subsystem 105 which is located on a cloud server 108. The processing subsystem 105 is configured to execute on a network to control bidirectional communications among a plurality of modules. For example, the communication network may include a wireless communication network 115.

The order receiving module 110 receives one or more purchase orders corresponding to one or more products from a buyer 102 at a first platform 112. For example, the one or more purchase orders may have information of at least one of a type of one or more products, a quantity of one or more products, agreed price for one or more products from a supplier or a combination thereof. In the example used herein, the one or more purchase orders corresponding to each of the one or more products are received from the buyer at a website associated with a primary merchant.

Once, the one or more purchase orders are received, an order handling module 120 is configured to determine product state information associated with the first platform 112. For example, the product state information may include at least one of stock availability with a primary merchant, urgency of delivery requirement of the buyer, distance between a primary merchant and the buyer or a combination thereof. The order handling module 120 also identifies a requirement of transferring the one or more purchase orders corresponding to the one or more products to a second platform based on the product state information determined. For example, the second platform includes a website associated with an original equipment manufacturer (OEM). In another example, the second platform may also include a website associated with a secondary merchant. In the example used herein, the secondary merchant may include a supplier or an external service provider for supplying the order of the one or more products to one or more customers.

Upon identifying the transferring requirement, the order handling module 120 is configured to transfer the one or more purchase orders from the first platform to the second platform 125 via one or more order transferring processes. For example, the one or more order transferring process includes at least one of an electronic data interchange (EDI) process, a secure file transfer protocol (SFTP), an application programming interface (API) or a combination thereof. The EDI process helps in exchanging of the one or more purchase orders as well as one or more commercial documents in a standard electronic format between several platforms. Similarly, the SFTP protocol provides file access, file transfer, and file management over any reliable data stream across the several platforms. Again, the API enables several platforms to communicate with each other in order to pump information from one platform to another automatically.

Upon transferring of the one or more purchase orders, an order fulfilment module 130 is configured to convey buyer information associated with purchasing of the one or more products to the second platform seamlessly. In the example used herein, the buyer information includes at least one of a credit card information of the buyer, a billing address of the buyer, a shipping address of the buyer, a mode of payment selected by the buyer or a combination thereof. The order fulfilment module 130 is also configured to manage one or more payment options provided by the second platform for financing the one or more products to the buyer based on the buyer information conveyed. In one example, the one or more payment options includes at least one of a pay on delivery option, an internet banking payment option, a loan option, a debit card payment option, a credit card payment option, or an equated monthly installment option.

Upon completion of the payment of the one or more products through the one or more payment options, the order fulfilment module 130 also receives delivery initiation information of the one or more products to the buyer from the second platform. The order fulfilment module 130 is also configured to obtain an order fulfilment confirmation from the second platform upon successful delivery of the one or more products to the buyer.

Further, for handling the payment process, a payment handling module 140 notifies one or more external finance providers integrated with the system to sanction a predefined loan amount for financing the one or more products to the buyer when the one or more payment options comprises a loan option. For example, the predefined loan amount, is sanctioned by the one or more finance providers based on evaluation of credit information of the buyer. In such an example, the credit information is evaluated based on a credit score associated with the purchaser. Here, the credit score is fetched from an external interface. Once, the credit history is evaluated, the payment handling module 140 sanctions the predefined loan amount to the buyer, wherein the predefined loan amount includes a virtual credit amount for utilization purchasing of the one or more products.

In addition, the processing subsystem 105 further includes an order tracking module 150 configured to receive a tracking identity number associated with delivery of the one or more products from the second platform. For example, the tracking identity number includes a unique number of a predetermined format. The order tracking module 150 is also configured to provide the tracking identity number corresponding to each of the one or more products to the buyer for real-time tracking of order fulfilment process. Thus, the system 100 helps in efficiently running the ecommerce business in a much easier way where the e-commerce platform does not need to physically manage the inventory or to pay for a warehouse. Also, the system 100 manages the complete order fulfilment process starting from packing, shipping or return handling of the one or more products.

Figure 4:
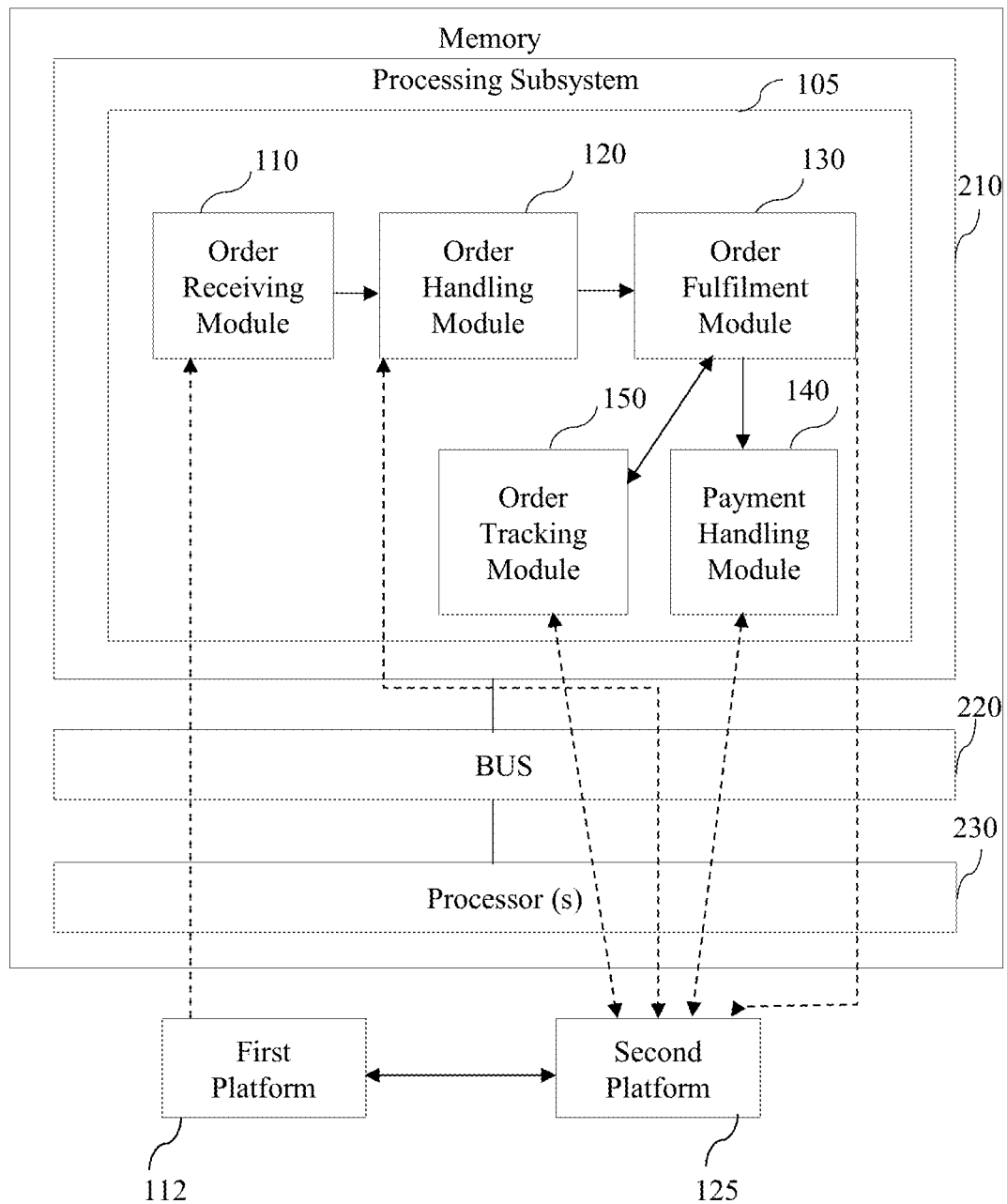
FIG. 4 is a block diagram of a computer or a server in accordance with an embodiment of the present disclosure.

FIG. 4 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 is includes a processing subsystem 105 of FIG. 1. The processing subsystem 105 further has following modules: an order receiving module 110, an order handling module 120, an order fulfilment module 130, a payment handling module 140, an order tracking module 150.

The processing subsystem 105 includes an order receiving module configured to receive one or more purchase orders corresponding to one or more products from a buyer at a first platform. The processing subsystem 105 also includes an order handling module 120 configured to determine product state information associated with the first platform based on the one or more purchase orders received corresponding to the one or more products. The order handling module 120 is also configured to identify a requirement of transferring the one or more purchase orders corresponding to the one or more products to a second platform based on the product state information determined. The order handling module 120 is also configured to transfer the one or more purchase orders from the first platform to the second platform via one or more order transferring processes based on a transferring requirement identified. The processing subsystem 105 also includes an order fulfilment module 130 to convey buyer information associated with purchasing of the one or more products to the second platform seamlessly upon transferring of the one or more purchase orders. The order fulfilment module 130 is also configured to manage one or more payment options provided by the second platform for financing the one or more products to the buyer based on the buyer information conveyed. The order fulfilment module 130 is also configured to receive delivery initiation information of the one or more products to the buyer from the second platform, wherein the delivery initiation information is received upon completion of payment of the one or more products through the one or more payment options. The order fulfilment module 130 is also configured to obtain an order fulfillment confirmation from the second platform upon successful delivery of the one or more products to the buyer. The processing subsystem 105 also includes a payment handling module 140 configured to notify one or more external finance providers integrated with the system to sanction a predefined loan amount for financing the one or more products to the buyer when the one or more payment options comprises a loan option. The processing subsystem 105 also includes an order tracking module configured to receive a tracking identity number associated with delivery of the one or more products from the second platform. The order tracking module 150 is also configured to provide the tracking identity number corresponding to each of the one or more products to the buyer for real-time tracking of order fulfillment process.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 5:
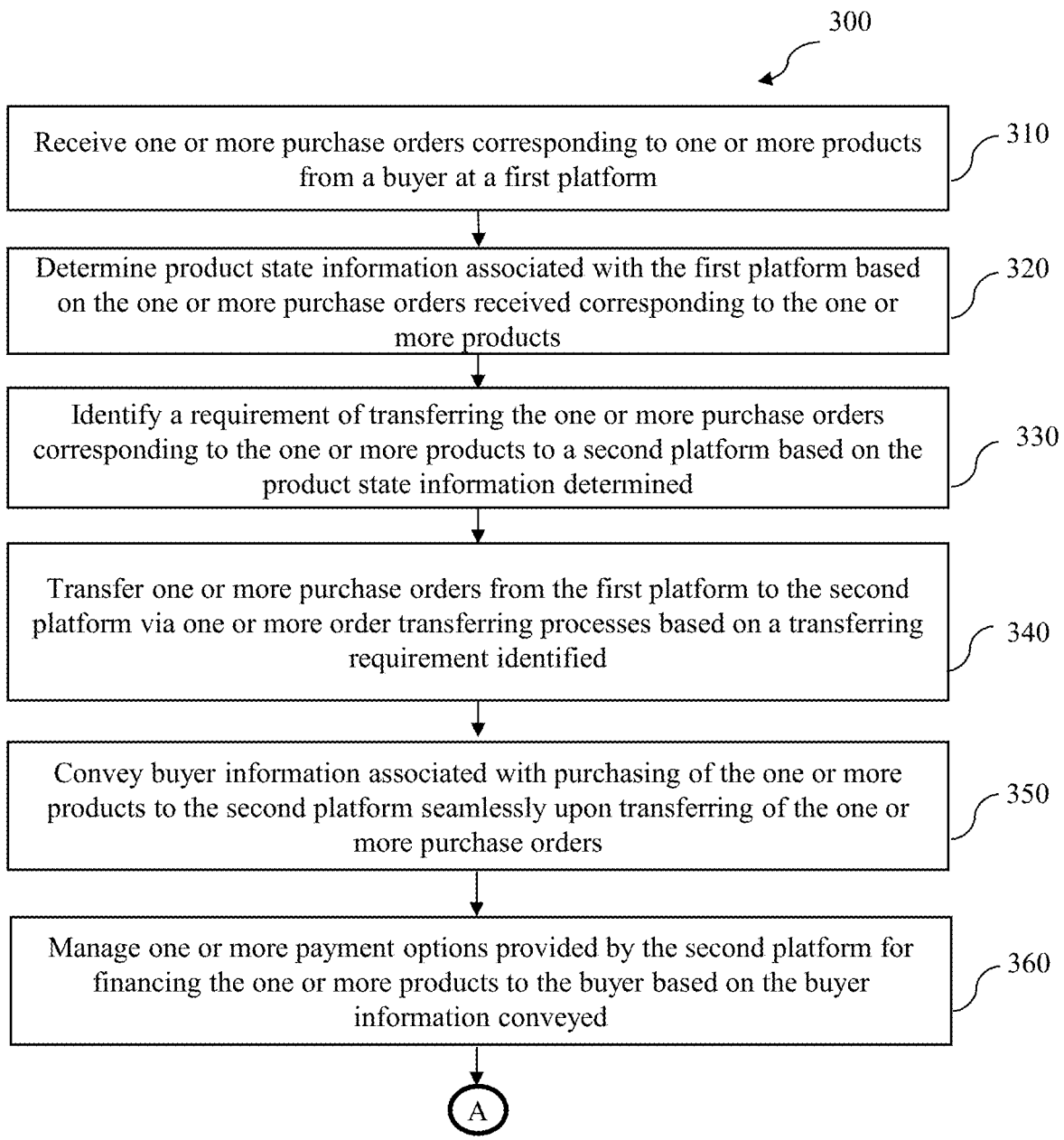
FIG. 5 (a) illustrates a flowchart representing the steps involved in a method to manage bi-directional electronic commerce order fulfillment process of FIG. 1 in accordance with an embodiment of the present disclosure.
Figure 5:
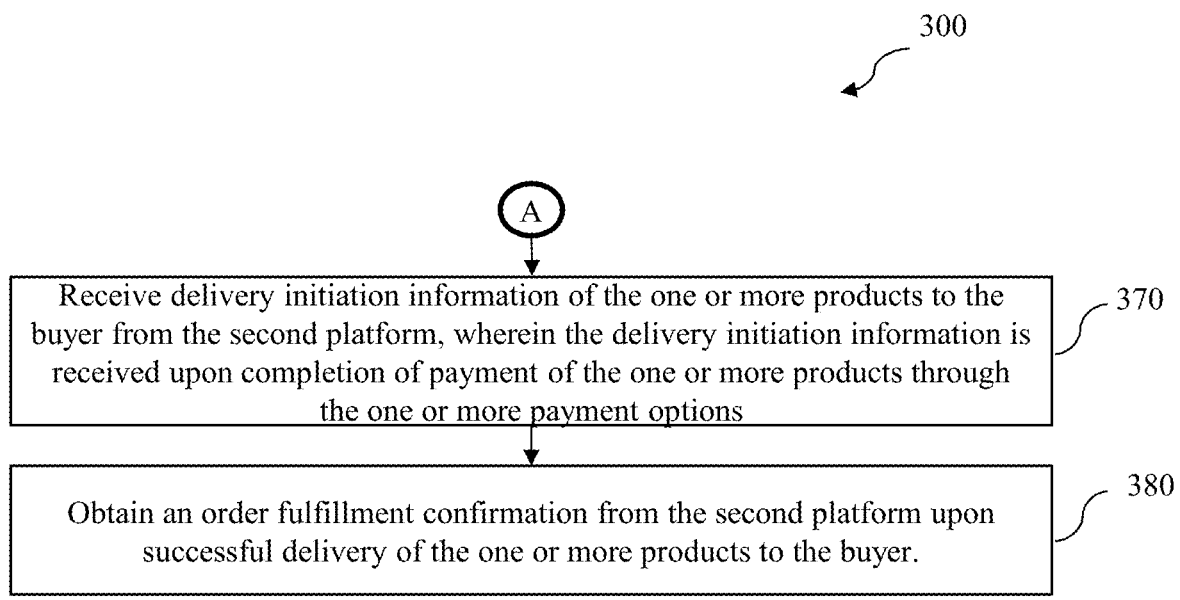

FIG. 5 (*a*) illustrates a flowchart representing the steps involved in a method to manage bi-directional electronic commerce order fulfillment process of FIG. 1 in accordance with an embodiment of the present disclosure. The method 300 includes receiving, by an order receiving module of a processing subsystem, one or more purchase orders corresponding to one or more products from a buyer at a first platform in step 310. In one embodiment, receiving the one or more purchase orders corresponding to the one or more products includes receiving the one or more purchase orders having information of at least one of a type of one or more products, a quantity of one or more products, agreed price for one or more products from a supplier or a combination thereof. In some embodiment, receiving the one or more purchase orders includes receiving the one or more purchase orders corresponding to the one or more products which may include, but not limited to, an electronics product, a fashion accessory, an apparel, a stationary product, an edible product, a home decor product, a home appliance and the like.

The method 300 also includes determining, by an ordering handling module of the processing subsystem, product state information associated with the first platform based on the one or more purchase orders received corresponding to the one or more products in step 320. In one embodiment, determining the product state information associated with the first platform includes determining at least one of stock availability with a primary merchant, urgency of delivery requirement of the buyer, distance between a primary merchant and the buyer or a combination thereof.

The method 300 also includes identifying, by the order handling module, a requirement of transferring the one or more purchase orders corresponding to the one or more products to a second platform based on the product state information determined in step 330. The method 300 also includes transferring, by the order handling module, one or more purchase orders from the first platform to the second platform via one or more order transferring processes based on a transferring requirement identified in step 340. In one embodiment, transferring the one or more purchase orders from the first platform to the second platform includes transferring the one or more purchase orders to a website associated with an original equipment manufacturer (OEM) seamlessly. In another embodiment, transferring the one or more purchase orders from the first platform to the second platform includes transferring the one or more purchase orders to a website associated with a secondary merchant. In such embodiment, the secondary merchant may include a supplier or an external service provider for supplying the order of the one or more products to one or more customers. In a specific embodiment, transferring the one or more purchase orders from the first platform to the second platform includes transferring the one or more purchase orders via the one or more order transferring processes which includes at least one of an electronic data interchange (EDI) process, a secure file transfer protocol (SFTP), an application programming interface (API) or a combination thereof The method 300 also includes conveying, by an order fulfillment module, buyer information associated with purchasing of the one or more products to the second platform seamlessly upon transferring of the one or more purchase orders in step 350. In one embodiment, conveying the buyer information associated with the purchasing of the one or more products to the second platform includes conveying at least one of a credit card information of the buyer, a billing address of the buyer, a shipping address of the buyer, a mode of payment selected by the buyer or a combination thereof.

The method 300 also includes managing, by the order fulfillment module, one or more payment options provided by the second platform for financing the one or more products to the buyer based on the buyer information conveyed in step 360. In one embodiment, managing the one or more payment options provided by the second platform for financing the one or more products to the buyer includes managing at least one of a pay on delivery option, an internet banking payment option, a loan option, a debit card payment option, a credit card payment option, or an equated monthly installment option.

FIG. 5 (*b*) illustrates continued steps of the method of FIG. 5 (*a*) in accordance with an embodiment of the present disclosure. The method 300 also includes receiving, by the order fulfillment module, delivery initiation information of the one or more products to the buyer from the second platform, wherein the delivery initiation information is received upon completion of payment of the one or more products through the one or more payment options in step 370. The method 300 also includes obtaining, by the order fulfillment module, an order fulfillment confirmation from the second platform upon successful delivery of the one or more products to the buyer in step 380.

Various embodiments of the present disclosure provide an order fulfilment process in which order information of the one or more products from one platform is automatically pumped to another platform which not only saves time but also reduces manual intervention.

Moreover, the present disclosed system fetches the buyer information from a particular platform via one or more order transferring processes and enables automatic transfer of such information to the supplier platform for efficient handling of the order fulfilment process.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system to manage bidirectional electronic commerce order fulfillment process comprising:
   a processor; and
   a memory coupled to the hardware processor, wherein the memory comprises a set of program instructions in the form of a plurality of subsystems, configured to be executed by the hardware processor, wherein the plurality of subsystems comprises:
   a processing subsystem hosted on a server and configured to execute on a network to control bidirectional communications among a plurality of modules comprising:
      an order receiving module configured to receive one or more purchase orders corresponding to one or more products from a buyer at a first platform;
      an order handling module operatively coupled to the order receiving module, wherein the order handling module is configured to:
         determine product state information associated with the first platform based on the one or more purchase orders received corresponding to the one or more products;
         identify a requirement of transferring the one or more purchase orders corresponding to the one or more products to a second platform based on the product state information determined; and
         transfer the one or more purchase orders from the first platform to the second platform via one or more order transferring processes based on a transferring requirement identified; and
      an order fulfillment module operatively coupled to the order handling module, wherein the order fulfillment module is configured to:
         convey buyer information associated with purchasing of the one or more products to the second platform seamlessly upon transferring of the one or more purchase orders;
         manage one or more payment options provided by the second platform for financing the one or more products to the buyer based on the buyer information conveyed;
         receive delivery initiation information of the one or more products to the buyer from the second platform, wherein the delivery initiation information is received upon completion of payment of the one or more products through the one or more payment options; and
         obtain an order fulfillment confirmation from the second platform upon successful delivery of the one or more products to the buyer.

2. The system of claim 1, wherein the server comprises a cloud server.

3. The system of claim 1, wherein the first platform comprises a website associated with a primary merchant.

4. The system of claim 1, wherein the product state information comprises at least one of stock availability with a primary merchant, urgency of delivery requirement of the buyer, distance between a primary merchant and the buyer or a combination thereof.

5. The system of claim 1, wherein the second platform comprises a website associated with an original equipment manufacturer or a website associated with a secondary merchant.

6. The system of claim 5, wherein the secondary merchant comprises a supplier involved with shipping of the one or more products to the buyer.

7. The system of claim 1, wherein the one or more order transferring processes comprises at least one of an electronic data interchange process, a secure file transfer protocol, an application programming interface or a combination thereof.

8. The system of claim 1, wherein the buyer information comprises at least one of a credit card information of the buyer, a billing address of the buyer, a shipping address of the buyer, a mode of payment selected by the buyer or a combination thereof.

9. The system of claim 1, wherein the one or more payment options comprises at least one of a pay on delivery option, an internet banking payment option, a loan option, a debit card payment option, a credit card payment option, or an equated monthly installment option.

10. The system of claim 1, wherein the processing subsystem comprises a payment handling module operatively coupled to the order fulfillment module, wherein the payment handling module is configured to notify one or more external finance providers integrated with the system to sanction a predefined loan amount for financing the one or more products to the buyer when the one or more payment options comprises a loan option.

11. The system of claim 10, wherein the predefined loan amount is sanctioned by the one or more finance providers based on evaluation of credit information of the buyer.

12. The system of claim 10, wherein the predefined loan amount sanctioned to the buyer comprises a virtual credit amount for utilization purchasing of the one or more products.

13. The system of claim 1, wherein the processing subsystem comprises an order tracking module operatively coupled to the order fulfillment module, wherein the order tracking module is configured to receive a tracking identity number associated with delivery of the one or more products from the second platform.

14. The system of claim 13, wherein the order tracking module is configured to provide the tracking identity number corresponding to each of the one or more products to the buyer for real-time tracking of order fulfillment process.

15. A method comprising:
   receiving, by an order receiving module of a processing subsystem, one or more purchase orders corresponding to one or more products from a buyer at a first platform;
   determining, by an ordering handling module of the processing subsystem, product state information associated with the first platform based on the one or more purchase orders received corresponding to the one or more products;
   identifying, by the order handling module, a requirement of transferring the one or more purchase orders corresponding to the one or more products to a second platform based on the product state information determined;
   transferring, by the order handling module, one or more purchase orders from the first platform to the second platform via one or more order transferring processes based on a transferring requirement identified;
   conveying, by an order fulfillment module, buyer information associated with purchasing of the one or more products to the second platform seamlessly upon transferring of the one or more purchase orders;
   managing, by the order fulfillment module, one or more payment options provided by the second platform for financing the one or more products to the buyer based on the buyer information conveyed;
   receiving, by the order fulfillment module, delivery initiation information of the one or more products to the buyer from the second platform, wherein the delivery initiation information is received upon completion of payment of the one or more products through the one or more payment options; and
   obtaining, by the order fulfillment module, an order fulfillment confirmation from the second platform upon successful delivery of the one or more products to the buyer.

16. The method of claim 15, comprising notifying, by a payment handling module of the processing subsystem, one or more external finance providers integrated with the system to sanction a predefined loan amount for financing the one or more products to the buyer when the one or more payment options comprises a loan option.

17. The method of claim 15, comprising receiving, by an order tracking module of the processing subsystem, a tracking identity number associated with delivery of the one or more products from the second platform.

18. The method of claim 17, comprising providing, by the order tracking module, the tracking identity number corresponding to each of the one or more products to the buyer for real-time tracking of order fulfillment process.

* * * * *

UNITED STATES PATENT AND TRADEMARK OFFICE
CERTIFICATE OF CORRECTION

| | |
|---|---|
| PATENT NO. | : 11,475,506 B2 |
| APPLICATION NO. | : 17/203888 |
| DATED | : October 18, 2022 |
| INVENTOR(S) | : Kumar N. Senthil et al. |

It is certified that error appears in the above-identified patent and that said Letters Patent is hereby corrected as shown below:

On the Title Page

Item (12), delete "Senthil" and insert --Senthil et al.--

Item (72), please add a second Inventor:
Stella Rowlett, Redmond, WA (US)

Signed and Sealed this
Eighth Day of November, 2022

Katherine Kelly Vidal
*Director of the United States Patent and Trademark Office*